March 9, 1965  H. R. SCHELP ETAL  3,172,253
COMBINATION TURBO AND RAMJET PROPULSION APPARATUS
Filed Jan. 2, 1959  2 Sheets-Sheet 1
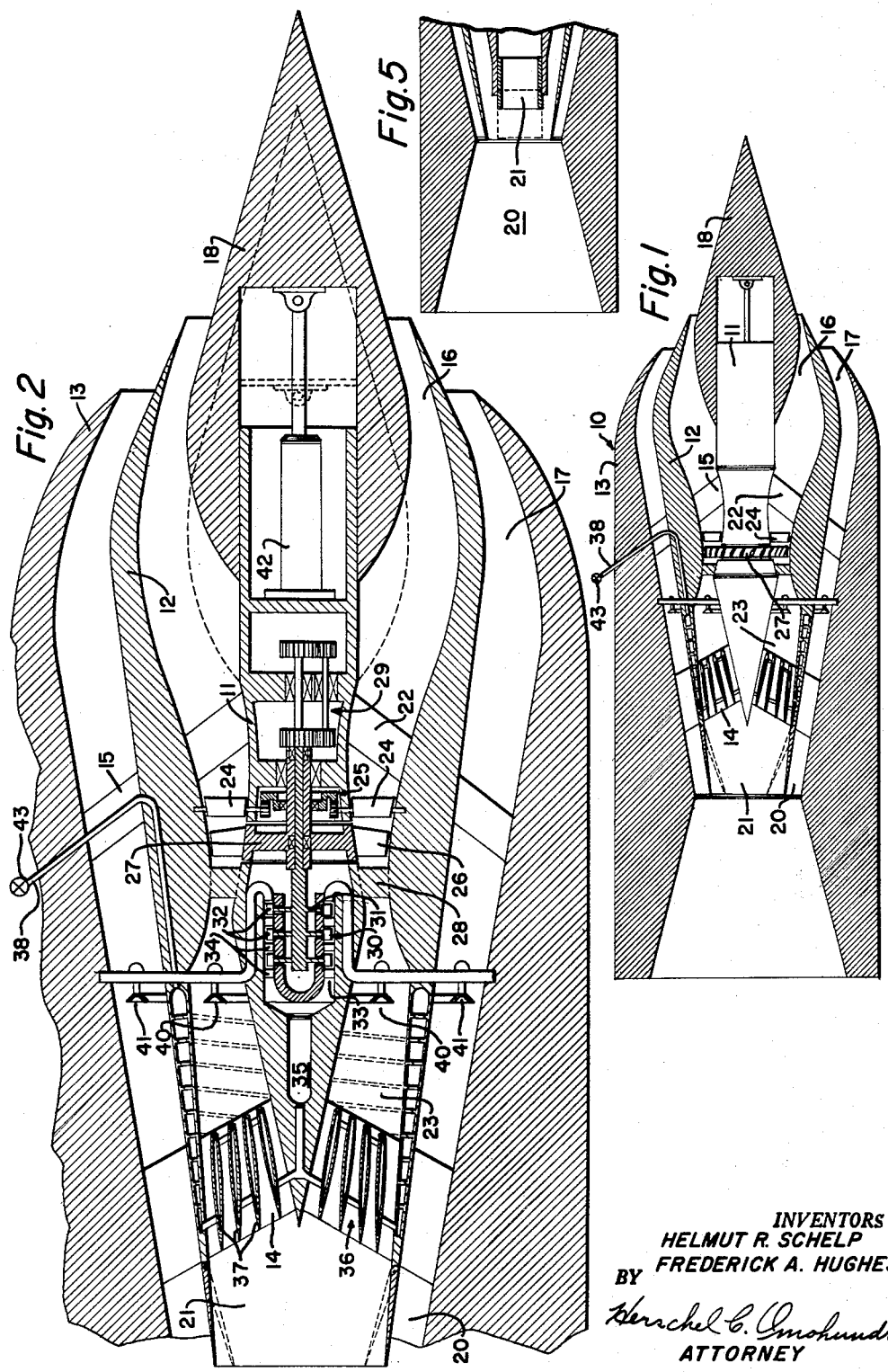
INVENTORS
HELMUT R. SCHELP
FREDERICK A. HUGHES
BY
Herschel C. Omohundro
ATTORNEY INVENTORS
HELMUT R. SCHELP
FREDERICK A. HUGHES
BY
Herschel C. Omohundro
ATTORNEY

United States Patent Office 3,172,253
Patented Mar. 9, 1965

3,172,253
COMBINATION TURBO AND RAMJET PROPULSION APPARATUS
Helmut Rudolf Schelp, Scottsdale, and Frederick Ambrose Hughes, Phoenix, Ariz., assignors to The Garrett Corporation, Los Angeles, Calif., a corporation of California
Filed Jan. 2, 1959, Ser. No. 784,821
6 Claims. (Cl. 60—35.6)

This invention relates generally to thrust producing apparatus for aircraft or other vehicles, and is more particularly directed to the combination of a plurality of different types of power-producing devices having certain desirable characteristics to provide a unit capable of performing in a predetermined manner.

Propulsion devices heretofore provided have been designed with certain operational features in mind. For example, gas turbine jet type engines are designed to produce propulsive forces useful for vehicle takeoff and flight at subsonic air and low supersonic speeds, but such engines are relatively incapable of propelling vehicles at higher mach numbers. Another type of engine, more specifically, the ramjet, is designed to produce forces to drive the vehicle at high speed ranges, but such engine requires the vehicle powered thereby to be moving at high speeds before the engine becomes operative.

An object of this invention, therefore, is to provide a propulsion unit having the qualifications of both turbo and ramjet engines, so that a vehicle equipped therewith can take off under its own power, accelerate through subsonic speeds, and perform its mission at high mach number speeds, the unit also permitting the vehicle to land again under its own power.

An object of this invention also is to provide a propulsion unit having a combination of features selected from gas turbine jet and ramjet engines, so that a vehicle equipped with the unit may be operated during takeoff, acceleration and lower speed flight by the forces developed by one part of the unit and at higher speeds by the forces developed by another part of the unit, both parts serving, during operation at certain speeds, to produce propulsive forces and at least one of the parts serving at all times as an auxiliary power unit to effect the operation of accessories required to maintain the operation of the unit and the vehicle.

Another object of the invention is to provide a propulsion unit having means for forming a ramjet engine and enclosing a turbojet engine of a type in which fuel having certain desired characteristics is supplied under pressure to heat exchange means to be heated. The heated fuel is then supplied to the turbine of the turbojet engine in an uncombusted state to effect the operation of the latter engine through the expansion of the fuel, such expanded fuel then being supplied to combustion means of both engines to supply heat for the heat exchanger and to effect the propulsion of the carrying apparatus.

A further object of the invention is to provide a propulsion unit having a plurality of substantially concentric tubular shells disposed relative to one another to form ramjet and turbojet air passages, both of which are open at the front to receive ram air and communicate at the rear of the unit to form a jet nozzle, the ramjet air passage being substantially devoid of blades or other flow-resisting structure and having combustion means intermediate the ends to effect the expansion and increase the velocity of the air entering the passage, the turbojet air passage being shaped and provided with guiding, rotating and diffusing blades to effect the compression of air entering the same, such compressed air then being supplied with fuel and burned to heat more incoming fuel and to provide the unit with forward propulsive thrust forces.

A still further object of the invention is to provide the propulsion unit mentioned in the preceding paragraph with a diffuser at the forward end to collect and compress the ram air prior to entry thereof into the ramjet and turbojet air passages.

A further object of the invention is to provide the propulsion unit mentioned in the two preceding paragraphs with adjustable means for varying the effective area of the inlet to one or more of the air-receiving passages, so that air flow into the passages will be as smooth and turbulence-free as possible at all times. The inlet adjusting means may also serve to limit the volume of air admitted to one or more air passages as desired.

A still further object of the invention is to provide a propulsion unit having a ramjet engine enclosing a turbojet engine, both exhausting heated gases through a jet nozzle, the unit being provided with passage means which serve to conduct air from a suitable source to the jet nozzle to vary the effective area thereof and consequently vary the propulsive forces developed when the gas stream flows through the nozzle.

Other objects and advantages of the present invention will be apparent from the following description of two forms of the invention which have been schematically illustrated in the accompanying drawings, in which:

FIGURE 1 is a schematic view showing in axial section a propulsion unit formed in accordance with the present invention;

FIG. 2 is a similar view on a larger scale of a portion of the unit shown in FIG. 1;

FIG. 5 is a fragmentary axial sectional view showing the jet nozzle end of a propulsion unit with an axially adjustable section.

Figure 4:
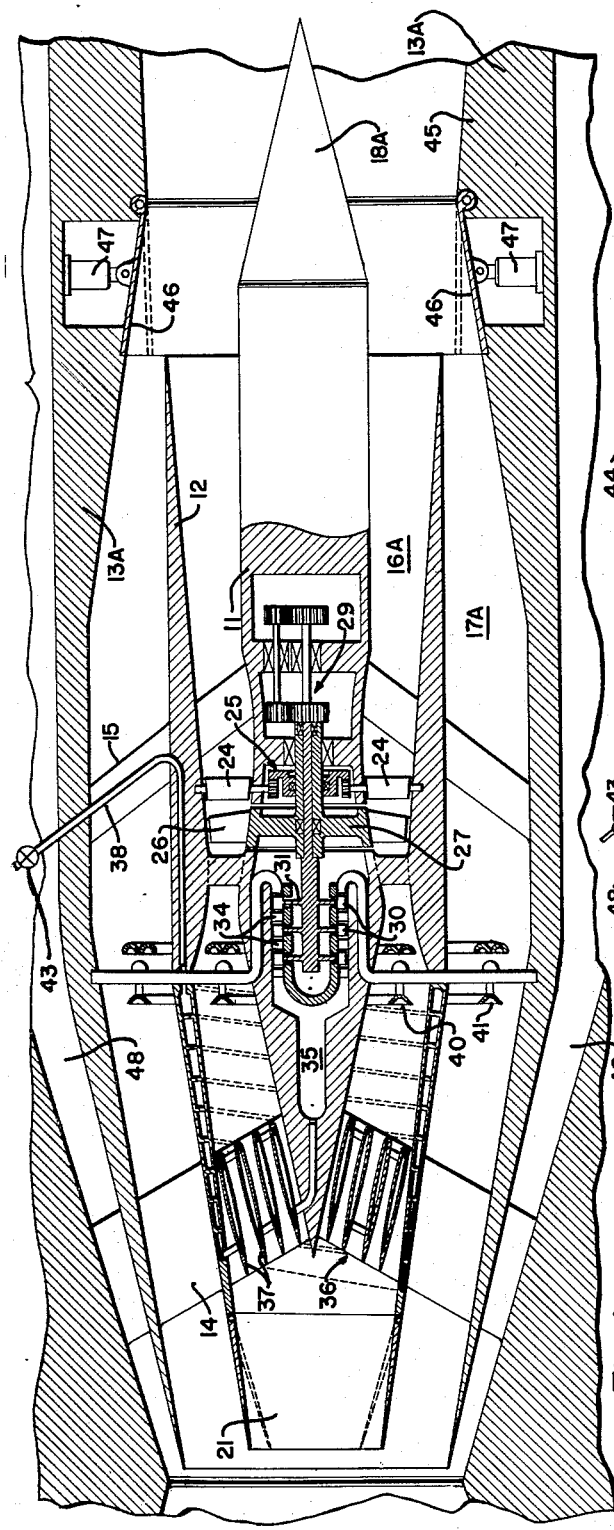
FIG. 4 is a similar view on a larger scale of a portion of the unit shown in FIG. 3.

Referring more particularly to FIGS. 1 and 2 of the drawings, the propulsion unit shown therein is designated generally by the numeral 10. It should be understood at the outset that this unit is shown only schematically in the drawings and many changes may be made in the construction and relation of parts without departing from the principles of the invention. As illustrated, the unit 10 is formed to include inner, intermediate and outer shells 11, 12 and 13, respectively, these shells being held in predetermined spaced relationship by struts 14 and 15 to provide inner and outer air passages 16 and 17. Both passages are open at the front end of the unit to receive air which, as will appear hereinafter, may be drawn into the passages and/or forced thereinto by the swift forward movement of the unit during operation.

As shown in FIGS. 1 and 2 of the drawings, the shell may be given a streamlined exterior shape to reduce wind resistance and facilitate movement thereof through the atmosphere. The inner shell may also be provided with a cone-shaped forward end or spike 18 to further reduce resistance to forward movement and guide air toward the inlet ends of the inner and outer passages 16 and 17.

As pointed out in the objects, the shells are provided to form ram and turbojet air passages, the passage 17 serving as the former or ramjet air passage and the passage 16 functioning as the turbojet air passage. These passages are suitably shaped to serve their intended purposes, both being of annular cross-sectional configuration throughout the major portions of their length and terminating at their rear ends in jet nozzles 20 and 21, preferably of circular cross section. Jet nozzle 21 is disposed concentrically within nozzle 20, the latter being of converging-diverging configuration and having its throat disposed substantially in the same plane as the outlet end of the nozzle 21 of the turbojet air passage. The inner shell 11 terminates in spaced relation from the nozzle 21, thus providing the latter with the circular cross section desired.

It will be noted that the inner and intermediate shells 11 and 12 are shaped to provide the turbojet air passage with an annular converging intermediate portion 22 which connects with an annular diverging portion 23. The portion 23 is formed by tapered sections of the inner and intermediate shells. Since the angles of the tapers of these portions are different, the angle of taper of the inner shell being greater, the portion 23 of the turbojet air passage diverges or increases in cross-sectional area and finally terminates in the jet outlet 21.

The converging intermediate portion of the turbojet air passage is provided with a plurality of angularly adjustable guide vanes 24. These vanes may be moved to different angular positions of adjustment by suitable mechanism 25 disposed, in this instance, in the inner shell 11. Vanes 24 serve to guide air admitted to the turbojet air passage into the blades 26 of a compressor impeller 27 at the most efficient angle. The air leaving the impeller blades flows between suitably inclined stationary blades 28 to be diffused and caused to flow in the proper direction.

As shown in FIG. 2, the impeller 27 is arranged to be driven through a gear train 29, which in turn is driven by an expansion turbine 30 of one or more stages. The turbine 30 is contained in the rear portion of the inner shell and comprises a rotor 31 with blades 32 supported for rotation in an annular passage 33 between banks of nozzle vanes 34. Passage 33 communicates at the turbine inlet end, with a passage 35 leading from the interior of a heat exchanger or fuel boiler 36. This device may be of many forms, the one illustrated having a plurality of hollow, aerodynamically shaped, concentric webs disposed in the portion 23 of turbojet air passage 16 and connected to form a tortuous fuel passage 37. Parts of such fuel passage may also be formed in the wall or walls of the ramjet air passage. Suitable tubes or ducts 38 may be provided to convey the fuel from a tank and pump (not shown) to the inlet of the heat exchanger 36.

Both of the passages 16 and 17 are provided with combustor elements or burners 40 and 41. These burners may also be of suitable form, having flame holders and igniters as required. Combustors 40 are disposed in the turbojet air passage at the upstream end of the portion 23 to supply fuel to the air discharged by the compressor impeller. The fuel, having been heated in the heat exchanger or boiler 36 and expanded in the turbine 30, flows to the burners 40 and issues therefrom in a spray to combine with the air from the compressor and burn in the portion 23 of the air passage 16. Heat from this burning fuel is imparted to the heat exchanger to be transferred to more incoming fuel. After flowing through the heating fluid passages of the heat exchanger, the burned gases pass through the jet nozzles 20 and 21. The reaction of this blast of heated air and other gases imparts thrust to the unit. The gases flowing with great speed through the nozzle 21 will also serve as an injector, causing air to be drawn through the ramjet air passage 17 when the unit is standing still or moving at relatively slow speeds. When the unit moves rapidly, ram air entering the front end will be forced through the ramjet air passage 17. As previously stated, passage 17 is also provided with combustors or burners 41 which are supplied with expanded fuel. This fuel, issuing from the burners 41, combines with air flowing through passage 17 and burns, thus increasing the volume and velocity of fluid flowing through the ramjet passage. As this expanded air and gas flows from nozzle 20, additional propulsive force will be transmitted to the unit.

To insure the smooth, even entry of air into passages 16 and 17 at all speeds of the unit through the atmosphere, the cone or spike 18 is adjustable in axial directions by a power cylinder 42. When in the full line position of FIG. 2, the larger portion of spike 18 partially closes the forward end of passage 16 and limits the quantity of air entering the passage. In this position the spike also directs air into the forward end of the passage 17, excess air being caused to flow smoothly over the outer surface of the outer shell 13. This air-directing operation prevents back pressure from the accumulation of air in passage 16 and uncontrolled spilling of air over the lips of the shells 12 and 13. If the spike is retracted to the dotted line position, the inlet end of the passage 16 is fully open and a maximum amount of air may enter. This position of the spike may be used when the unit is moving through the air at lower speeds. The adjustment of the spike 18 serves to match the oblique shock pattern and inlet areas, thus minimizing inlet losses and optimizing ram recovery and engine performance.

As shown by dotted lines in FIGS. 1, 2 and 5, the terminal portions of the intermediate shell may be adjusted to vary the effective area of the turbojet outlet.

The operation of a propulsion unit embodying the principles of the invention is as follows: Fuel is supplied under pressure to the heat exchanger. Suitable means (not shown) for initially heating the latter may be provided to start the vaporization of the fuel. A starting motor (not shown) may also be provided to drive the compressor impeller and turbine rotor until the operation thereof is self-sustaining. After starting, rotation of the compressor impeller will draw air into the passage 16 and compress it, after which fuel is added and the mixture burned. The heated air and gases of combustion flow through the heat exchanger 36 to heat and vaporize more fuel. From the heat exchanger the products of combustion will pass from the nozzle 21 and through the diverging end of nozzle 20 in a jet stream. The reaction will impart thrust to the unit to propel it in a forward direction. As pointed out, the flow of gases through the nozzles 20 and 21 functions in the nature of an injector and causes air to be drawn through the passage 17. This passage is provided with combustors or burners 41 for mixing vaporized fuel with the air flowing through the passage. Burning of this fuel-air mixture increases the volume, causing more hot gases to be discharged through the jet nozzles and increasing the thrust of the unit. When the unit has attained sufficient speed, the ram air entering the ramjet passage will support the operation of the unit at high speed. At this time the turbojet will function as an auxiliary power unit for driving fuel pumps, generators, etc., for maintaining operation of the unit. The major task of generating propulsive thrust will then be performed by the ramjet section of the unit. Suitable valve means 43 may be provided to adjust the flow of fuel to the burners 40 and 41 to effect the desired operations.

Figure 3:
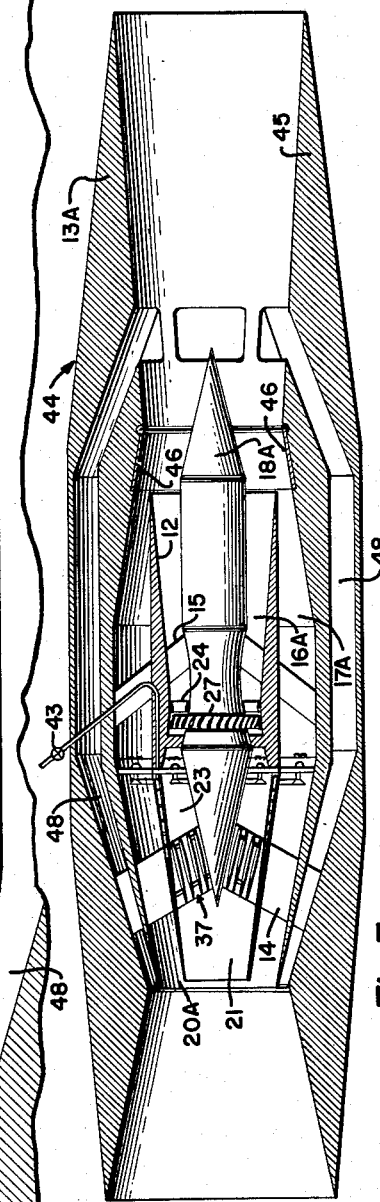
FIG. 3 is also a schematic view showing in axial section a slightly modified form of propulsion unit embodying the principles of the present invention.

The modified form of the invention shown in FIGS. 3 and 4 is substantially the same as that shown in FIGS. 1 and 2 with minor differences. In the second form 44 of the invention, the outer shell 13a is extended at the front end to provide an elongated converging diffuser 45 to collect and increase the density of the ram air prior to entry thereof into the turbojet and ramjet air passages 16a and 17a. The forward end of the inner shell is provided with a fixed spike 18a, although a movable one could be employed if found to be advantageous.

In certain stages of operation of the unit 44 the air-receiving capacity of the passage 17a may be varied through the adjustment of pivoted gates or valve plates 46. Such plates are supported for movement between a position, shown in full lines in FIGS. 3 and 4, in which the passage 17a is fully open to a fully or partly closed position, as shown by dotted lines in FIG. 4. Suitable power cylinders 47 may be provided to effect the adjustment of the valve plates 46.

Unit 44 is further modified by the provision of additional air channels 48 which extend from the vicinity of the inner end of diffuser 45 rearwardly to communicate with the jet nozzle 20a at the throat. These additional air channels permit the introduction of supplemental air to the nozzle. Such air will flow in strata or layers along the diverging surfaces of the nozzle and the thickness of the stratum at any particular time will determine the effective area of the jet nozzle. The volume of air flowing through the channels 48 will depend in part on the speed of the unit through the atmosphere and also on the positions of the valve plates 46.

It may also be found desirable to adjust the nozzle of the turbojet engine relative to the nozzle of the outer shell. This adjustment may be performed either by varying the area of the turbojet nozzle or moving the same axially of the unit, as illustrated in FIG. 5. Suitable means (not shown) may be provided to effect this movement of the nozzle.

We claim:

1. Propulsion apparatus comprising: inner and outer shells disposed to form a ramjet passage open at its forward end to receive ram air and having a converging-diverging jet nozzle at the rear end, said jet nozzle having a throat between the converging and diverging portions; a turbojet engine disposed in said inner shell, the latter having an inlet for air at its forward end and a converging jet nozzle at the rear end, said converging jet nozzle communicating with said ramjet passage adjacent the throat of said ramjet nozzle and directing the turbojet engine exhaust therethrough to induce air flow through said ramjet passage; and combustor means disposed in said ramjet passage upstream from the point of communication of said turbojet engine nozzle therewith.

2. Propulsion apparatus comprising: inner and outer shells disposed to form a ramjet passage open at its forward end to receive ram air and having a converging-diverging jet nozzle at the rear end, said jet nozzle having a throat between the converging and diverging portions; a turbojet engine disposed in said inner shell, the latter having an air inlet at its forward end and a converging jet nozzle at the rear end, said converging jet nozzle communicating with said ramjet passage at adjacent the throat of said ramjet nozzle and directing the turbojet engine exhaust therethrough to induce air flow through said ramjet passage; combustion means disposed in said ramjet passage upstream from the point of communication of said turbojet engine nozzle therewith; and means for varying the effective cross-sectional area of the jet nozzle of said inner shell.

3. Propulsion apparatus comprising: shell means providing a plurality of concentric passages open to receive air at their forward ends the outermost passage terminating in a converging-diverging jet nozzle at the rear end, the innermost passage terminating in a converging jet nozzle at the throat of the converging-diverging nozzle; compressor means disposed intermediately of the innermost of said passages to increase the pressure of air entering the same; heat exchanger means having fuel and heating fluid flow passages supported by said shell means, the heating fluid passage forming a part of the innermost air passage between said compressor means and said jet nozzle, the inlet end of the fuel flow passage of said heat exchanger means being formed to receive fluid fuel; an expansion turbine in driving relation with said compressor means, the inlet to said turbine communicating with the outelet of the fuel flow passage of said heat exchanger means; and combustor means in said air-receiving passages communicating with the outlet from said turbine, said combustor means being disposed at the upstream side of said heat exchanger means to expose all exterior walls of the latter to gases of combustion.

4. Propulsion apparatus comprising: inner, intermediate and outer shells disposed to form inner and outer substantially annular passages, the outer passage constituting a ramjet passage having an inlet at one end and a converging-diverging jet nozzle at the other end, the inner passage also having an inlet at one end, a converging intermediate portion, a diverging portion leading from said converging intermediate portion and terminating in a converging jet nozzle disposed adjacent the throat of the jet nozzle of said ramjet passage; a single stage compressor supported by said inner shell, said compressor having an impeller with blades disposed in the converging intermediate portion of said inner passage; turbine means in said inner shell in driving relation with said compressor impeller; heat exchanger means in the diverging portion of said inner passage; combustor means in said inner and outer passages, the combustor means in the inner passage being disposed between said compressor impeller and said heat exchanger to expose the latter to gases from the combustor; and means for conducting fuel to said heat exchanger then from the latter to said turbine, the exhaust from said turbine being supplied to said combustor means.

5. Propulsion apparatus comprising: inner, intermediate and outer shells disposed to form inner and outer air passages of substantially annular cross section, the outer air passage constituting a ramjet passage having an inlet at one end and a converging-diverging jet nozzle at the other end, the inner air passage also having an inlet at one end, a converging intermediate portion and a converging jet nozzle adjacent the throat of said converging-diverging jet nozzle; a compressor supported by said inner shell, said compressor having an impeller with blades disposed in the converging intermediate portion of said inner air passage; turbine means in said inner shell, said turbine means having a gas passage of annular cross section and a rotor with blades projecting into said gas passage, said rotor being in driving relationship with said compressor impeller; heat exchanger means supported by said shells and having hollow elements connected to form a tortuous gas passage, the elements being spaced to provide heating fluid passages forming a part of said inner air passage between the converging intermediate portion and said converging jet nozzle; means conducting fluid fuel to said tortuous gas passage and from the latter to the gas passage in said turbine; and combustor means in said air passages at the upstream side of said heat exchanger means, said combustor means communicating with the outlet of said turbine gas passage, said hollow fuel receiving elements being exposed to the gases from the combustor means.

6. Propulsion apparatus comprising: inner, intermediate and outer shells disposed to form inner and outer air passages of substantially annular cross section, the outer air passage constituting a ramjet passage having a converging inlet projecting forwardly beyond the forward end of the intermediate shell and a converging-diverging jet nozzle at the rear end, the inner air passage having an inlet adjacent the inner end of the converging inlet of the outer air passage, a converging intermediate portion, and a converging jet nozzle adjacent the throat of said converging-diverging jet nozzle, said outer shell forming auxiliary air passages extending from the rear portion of the converging inlet of said outer air passage to the throat of said converging-diverging jet nozzle; means in one of said shells for varying the volume of air flowing from the converging inlet through said outer air passage; a compressor supported by said inner shell, said compressor having an impeller with blades disposed in the converging intermediate portion of said inner air passage; turbine means in said inner shell, said turbine means having a gas passage of annular cross section and a rotor with blades projecting into said gas passage, said rotor being in driving relationship with said compressor impeller; heat exchanger means supported by said shells and having hollow elements connected to form a tortuous gas passage, the elements being spaced to provide heating fluid passages forming a part of said inner air passage between the converging intermediate portion and said converging jet nozzle; means conducting fluid fuel to said tortuous gas passage and from the latter to the gas passage in said turbine; and combustor means in said air passages at the upstream side of said heat exchanger means, said combustor means communicating with the outlet of said turbine gas passage, said hollow fuel receiving elements being exposed to gases from said combustor means.

References Cited in the file of this patent

UNITED STATES PATENTS

| | | |
|---|---|---|
| 1,375,601 | Morize | Apr. 19, 1921 |
| 2,091,808 | Dake | Aug. 31, 1937 |
| 2,483,045 | Harby | Sept. 27, 1949 |
| 2,563,270 | Price | Aug. 7, 1951 |
| 2,579,043 | Kallal | Dec. 18, 1951 |
| 2,586,025 | Godfrey | Feb. 19, 1952 |
| 2,589,548 | Imbert | Mar. 18, 1952 |
| 2,596,435 | Robert | May 13, 1952 |
| 2,597,253 | Melchior | May 20, 1952 |
| 2,610,465 | Imbert et al. | Sept. 16, 1952 |
| 2,620,625 | Phaneuf | Dec. 9, 1952 |
| 2,641,902 | Kerr | June 16, 1953 |
| 2,675,196 | Marnay | Apr. 13, 1954 |
| 2,696,078 | Waitzman | Dec. 7, 1954 |
| 2,721,444 | Johnson | Oct. 25, 1955 |
| 2,745,249 | Sanborn | May 15, 1956 |
| 2,872,780 | Schmidt | Feb. 10, 1959 |
| 2,920,448 | Coanda | Jan. 12, 1960 |
| 2,934,895 | Gregory et al. | May 3, 1960 |
| 2,955,414 | Hausmann | Oct. 11, 1960 |
| 2,974,481 | Smith | Mar. 14, 1961 |
| 3,000,176 | Kuhrt | Sept. 19, 1961 |
| 3,032,977 | Neitzel | May 8, 1962 |